(12) United States Patent
Doherty et al.

(10) Patent No.: US 8,708,841 B2
(45) Date of Patent: Apr. 29, 2014

(54) SYSTEMS AND METHODS FOR GOLF PERFORMANCE ANALYTICS

(75) Inventors: Matthew P. Doherty, North Palm Beach, FL (US); James F. Doherty, III, Raleigh, NC (US); William G. Moore, Raleigh, NC (US)

(73) Assignee: SkyHawke Technologies, LLC, Ridgeland, MS (US)

( * ) Notice: Subject to any disclaimer, the term of this patent is extended or adjusted under 35 U.S.C. 154(b) by 834 days.

(21) Appl. No.: 12/012,942

(22) Filed: Feb. 6, 2008

(65) Prior Publication Data

US 2008/0188330 A1     Aug. 7, 2008

Related U.S. Application Data

(60) Provisional application No. 60/899,914, filed on Feb. 7, 2007.

(51) Int. Cl.
*A63F 9/24*     (2006.01)
*A63F 13/00*    (2006.01)

(52) U.S. Cl.
USPC ............................ 473/406; 473/131; 473/407

(58) Field of Classification Search
USPC .......................................... 473/131, 406, 407
See application file for complete search history.

(56) References Cited

U.S. PATENT DOCUMENTS

| | | | |
|---|---|---|---|
| 4,910,677 A * | 3/1990 | Remedio et al. | 700/92 |
| 5,127,044 A * | 6/1992 | Bonito et al. | 379/88.16 |
| 5,364,093 A | 11/1994 | Huston et al. | |
| 5,434,789 A | 7/1995 | Fraker et al. | |
| 5,438,518 A | 8/1995 | Bianco et al. | |
| 5,469,175 A | 11/1995 | Boman | |
| 5,524,081 A | 6/1996 | Paul | |
| 5,664,880 A * | 9/1997 | Johnson et al. | 473/407 |
| 5,685,786 A | 11/1997 | Dudley | |
| 5,689,431 A | 11/1997 | Rudow et al. | |
| 5,797,809 A * | 8/1998 | Hyuga | 473/407 |
| 5,810,680 A | 9/1998 | Lobb et al. | |
| 5,842,147 A | 11/1998 | Nimura et al. | |
| 5,878,369 A * | 3/1999 | Rudow et al. | 701/215 |
| 5,882,269 A | 3/1999 | Lewis | |
| 6,029,121 A | 2/2000 | Stashko | |
| 6,263,279 B1 | 7/2001 | Bianco et al. | |
| 6,278,402 B1 | 8/2001 | Pippin | |
| 6,304,211 B1 | 10/2001 | Boman | |
| 6,456,938 B1 | 9/2002 | Barnard | |
| 6,496,141 B2 | 12/2002 | Pippin | |
| 6,582,328 B2 | 6/2003 | Kuta et al. | |
| 6,705,942 B1 | 3/2004 | Crook et al. | |
| 6,908,404 B1 | 6/2005 | Gard | |
| 6,986,712 B1 * | 1/2006 | Ogawa | 463/42 |
| 6,998,965 B1 | 2/2006 | Luciano, Jr. et al. | |

(Continued)

OTHER PUBLICATIONS

"SKYCADDIE SG1 SG2 User Guide" source www.skygolf.com/support/userguides.aspx. Copyright 2001-2007 SkyHawke Technologies LLC.*

*Primary Examiner* — Steven J Hylinski
(74) *Attorney, Agent, or Firm* — Triangle Patents, PLLC

(57) ABSTRACT

Systems and methods providing statistical analytics of golf performance including text, tabular, graphic, and image-based outputs that include trends information for the golfer, all based upon actual golf play on course situations, wherein the golfer inputs shot data during play, without interrupting the flow of the game, and uploads the shot data for analytics and review online.

20 Claims, 20 Drawing Sheets

(56) References Cited

U.S. PATENT DOCUMENTS

| | | |
|---|---|---|
| 7,010,550 B2 | 3/2006 | Tarlie |
| 7,014,576 B1 | 3/2006 | Posey |
| 7,037,198 B2 * | 5/2006 | Hameen-Anttila ............. 463/41 |
| 7,118,498 B2 | 10/2006 | Meadows et al. |
| 7,121,962 B2 | 10/2006 | Reeves |
| 7,571,052 B2 * | 8/2009 | Liu ............................... 701/213 |
| 7,922,586 B2 * | 4/2011 | Heckendorf et al. ........... 463/42 |
| 2002/0019276 A1 | 2/2002 | Kuta et al. |
| 2002/0019677 A1 | 2/2002 | Lee |
| 2002/0027524 A1 | 3/2002 | Pippin |
| 2002/0038178 A1 * | 3/2002 | Talkenberg et al. .......... 701/200 |
| 2002/0052750 A1 | 5/2002 | Hirooka |
| 2002/0060642 A1 | 5/2002 | Togasaka |
| 2002/0072815 A1 | 6/2002 | McDonough et al. |
| 2002/0082122 A1 * | 6/2002 | Pippin et al. .................. 473/407 |
| 2002/0082775 A1 | 6/2002 | Meadows et al. |
| 2002/0188359 A1 | 12/2002 | Morese |
| 2003/0103001 A1 | 6/2003 | Huston et al. |
| 2003/0163210 A1 | 8/2003 | Adams |
| 2003/0191547 A1 | 10/2003 | Morse |
| 2004/0073325 A1 | 4/2004 | Reeves |
| 2004/0147329 A1 | 7/2004 | Meadows et al. |
| 2005/0026709 A1 * | 2/2005 | Palmer et al. .................. 473/131 |
| 2005/0030223 A1 | 2/2005 | Nozawa |
| 2005/0101415 A1 * | 5/2005 | Sweeney ....................... 473/407 |
| 2006/0030433 A1 | 2/2006 | Horsley |
| 2006/0212221 A1 | 9/2006 | Liu |
| 2007/0021226 A1 | 1/2007 | Tyroler |
| 2013/0237346 A1 * | 9/2013 | Sweeney, Mark ............ 473/407 |

* cited by examiner

SYSTEMS AND METHODS FOR GOLF PERFORMANCE ANALYTICS

CROSS-REFERENCE TO RELATED INVENTIONS

The present invention is based upon and claims priority from U.S. provisional patent application Ser. No. 60/899,914 filed Feb. 7, 2007, which is incorporated herein by reference in its entirety.

BACKGROUND OF THE INVENTION

1. Field of the Invention

The present invention relates generally to systems and methods for tracking and improving golf performance using statistical analysis of actual performance versus targets.

2. Description of the Prior Art

Generally, golf performance statistical programs are known, in particular for using GPS coordinates for tracking shot distances. However, detailed analytics that are specific to player status, course conditions, and other factors have not been included in tracking golf performance for players, in particular with interactivity and analytics provided based upon actual golf play under normal conditions, i.e., on a course, rather than through simulation or practice situations only. Thus there remains a need for systems and methods that provide for improved statistical analytics of golf performance and that include text, tabular, graphic, and image-based outputs that include trends information for the golfer, all based upon actual golf play on course situations, wherein the golfer inputs shot data during play, without interrupting the flow of the game, and uploads the shot data for analytics and review online.

SUMMARY OF THE INVENTION

A first aspect of the present invention is to provide a system for statistical analysis for golf performance of a user wherein the user provides inputs and coordinates of a series of corresponding starting points and target areas as well as recordation of actual shot locations from those starting points, and wherein the statistical analysis includes text, tabular, diagrammatic, and/or image-based outputs relating to trends in the user's golf performance over a predetermined period.

In a preferred embodiment, the system includes a portable unit operable for communication with a remote server computer, wherein the user inputs to the unit information and GPS data relating to the shots and the unit communicates that information to the server computer for analysis to be performed by software operating thereon. The system further provides for a unique login for each user to access the remote server computer for uploading his/her data, and for modifying and adding information, including secondary information that includes more detail about play conditions, user status, etc.

A second aspect of the present invention is to provide methods for statistical analysis of golf performance of a user including the steps of the user inputting information and corresponding coordinates for a series of shots including a start point and a target area, as well as actual shot location throughout a course of play; the user uploading that information and data to a remote server computer, where software is operable to perform statistical analysis and provide outputs to the user relating to trends in the user's performance over a predetermined period.

Thus, the present invention provides automatic analytics for user-provided inputs of golf performance over a period of time. Advantageously, compared with prior art, the present invention provides a significant level of detail and customization by the user so that the feedback or statistical output on golf performance and trends provides normalized information that is actionable by the user to correct or improve his/her game.

These and other aspects of the present invention will become apparent to those skilled in the art after a reading of the following description of the preferred embodiment when considered with the drawings, as they support the claimed invention.

DETAILED DESCRIPTION

Figure 1:
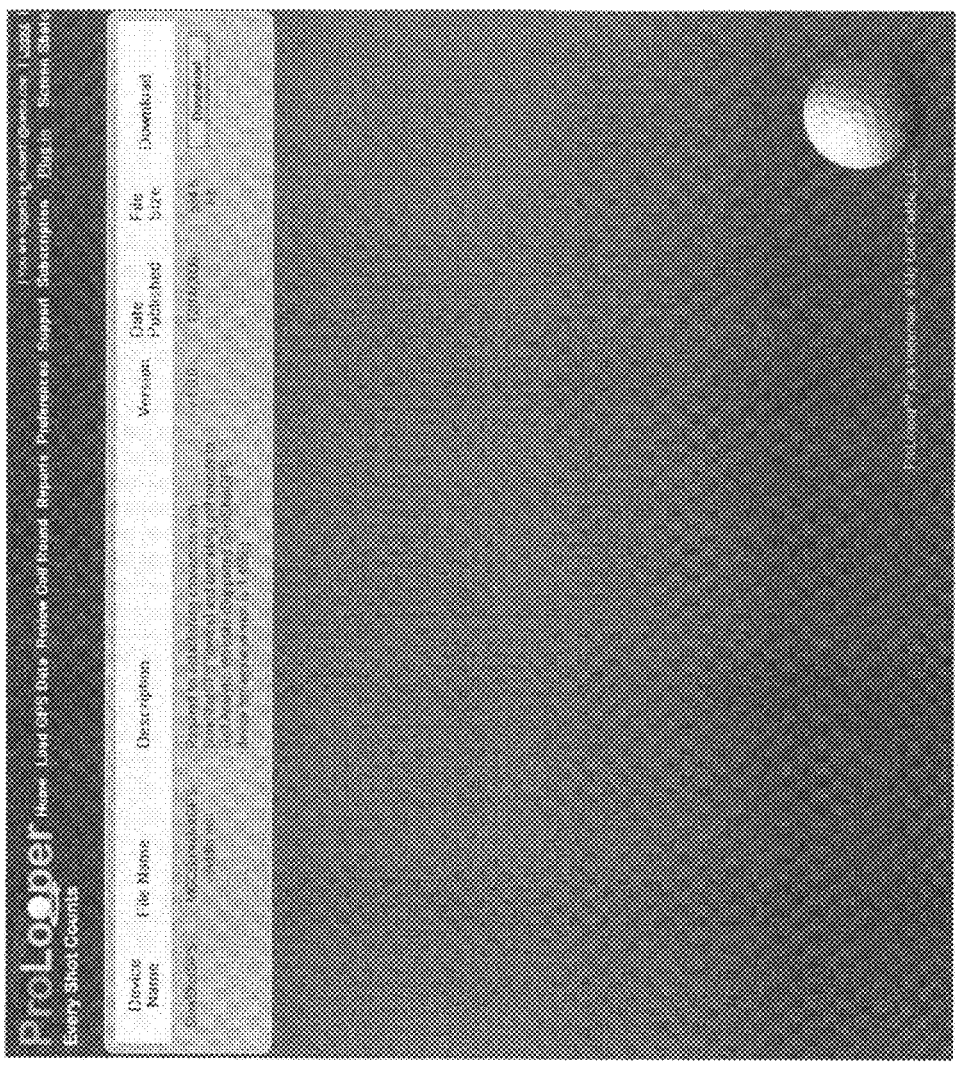
FIGS. 1-20 are screenshot images of user interfaces for entering information and viewing analytical outputs according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring to the drawings in general, the illustrations are provided for the purpose of describing a preferred embodiment of the invention and are not intended to limit the invention thereto. FIGS. 1-20 illustrate screen shot images of user interfaces for user input of information and coordinate data and for viewing statistical and analytical outputs.

The present invention provides a system for providing statistical analysis for golf performance of a user including a portable input device, preferably a handheld device with GPS-functionality, operable for capturing shot data during the golf play of a golfer, the device being further operable to transmit the shot data and related GPS data to a computer for reviewing the shot data and analysis of the shot data through a graphical user interface viewable on a display; the computer further including software operable for providing statistical analysis of the shot data; wherein the user provides inputs and coordinates of a series of corresponding starting points and target areas, and recordation of actual shot locations from those starting points during the golf play via the device; and wherein the statistical analysis includes outputs relating to the golfer's golf performance over a predetermined period.

Preferably, the statistical analysis of the shot data viewable via a graphic user interface on a display includes outputs selected from text, tabular, diagrammatic, image-based outputs, and combinations thereof; also, the statistical analysis includes trends in the golfer's golf performance over a predetermined period.

Also preferably, the computer is a remote server computer (RSC) and the shot data is uploaded from the device to the RSC through a communications network, such as the device uploading information through a computer (or directly, depending upon the device) that transmits the data for analysis and storage on the remote computer so that the user can access the data and review it at any time from nearly any place via the Internet or worldwide web network. The user may be provided a unique user identification associated with each golfer that is usable by the golfer to access a remote server computer for uploading his data, and for modifying and adding information, including secondary information, such as golf course conditions, weather, golfer status, equipment specifics, shot corrections, penalty shot positions, and combinations thereof.

In any case, it is preferred that the unit be operable to receive from the golfer shot data inputs including GPS data relating to golf shots, and wherein the unit is operable to transfer the shot input data to the computer for analysis to be performed by software operating thereon.

The present invention also provides a method for providing statistical analysis of golf performance of a golfer including the steps of the golfer inputting shot data including corresponding coordinates for a series of shots including a start point and a target area, as well as actual shot location throughout a course of play using a GPS-enabled input device; the user uploading the shot data to a remote server computer; software operable on the computer performs statistical analysis of the shot data associated with the golfer; and the software providing analytics outputs to the user via a display having a graphical user interface, including trends in the golfer's performance over a predetermined period.

Additionally, the golfer has review options provided on a graphical user interface on a display for reviewing, editing, modifying, and adding data to the uploaded shot data. In another embodiment, a method for providing statistical analytics of golf performance includes the steps of providing a GPS-operable device operable for a user to input golf shot data during play on a course; uploading the golf shot data including GPS data to a computer having software for providing analysis of the data; and providing outputs including analytics of the data, wherein the outputs are viewable by the user via a graphic user interface on a display. text, tabular, graphic, and image-based outputs that include trends information for the golfer, all based upon actual golf play on course situations, wherein the golfer inputs shot data during play, without interrupting the flow of the game, and uploads the shot data for analytics and review online. Again, the analytics preferably includes text, tabular, graphic, and image-based outputs that include trends information based upon the shot data input by the user, wherein the shot data is based upon actual golf play on course situations, and the golfer inputs shot data during play.

The present invention provides systems and methods for providing statistical analysis and corresponding outputs, including tabular and/or diagrammatic representation of golf performance by a user. The systems and methods further provide for software operable on a server computer on which the statistical analysis is performed on data uploaded from a portable device or unit having global positioning satellite (GPS) functionality. Preferably the user inputs predetermined information to the device during the course of golf play; these inputs are combined with GPS data or data points that correspond to the user's ball location, including respective start point and target areas, including an initial start point and final target area for each golf shot, wherein a series ultimately ends in a final shot successfully reaching a final end point or hole.

Preferably, device-specific software is installed and operational on the device to provide a user interface for the user inputting information regarding start points and target areas coupled in a series of at least one shot (formed by the start point and actual landing of the ball with respect to the target area) and for corresponding GPS data to be captured for those shots as well as for the target areas. An upload mechanism is operational on an individual user device or unit that is operable by an application user. The unit is equipped with global positioning satellite (GPS) functionality. Preferably, the present invention methods and system are operable on such a GPS-operable unit so that the application user of the unit inputs primary and secondary information that relate to his/her coordinates. Primary information includes a first position and a target area of the application user to the unit. In one embodiment, the first position and target area relate to a golf course, and more particularly to a hole playable on a golf course on which the application user is positioned to play. The present invention systems and methods are adaptable to be used on or retrofitted to existing GPS golf play units. Graphic user interface modifications and software of the present invention are uploaded via a software as a service (SaaS) operation from a network connected to the worldwide web ("the web").

In one embodiment of the present invention the GPS coordinates are generated using an ASP.NET library for the GPS calculations, for example as with Geo Frameworks—http://www.geoframeworks.com. For calculation of distances between two GPS coordinates, they use the Position class. Two instances of Position class are initiated with longitude and latitude that they get from the handheld GPS device, those positions are the start and result coordinates. Then use the Position.DistanceTo(Position destination) method (see description by the following link) to get the distance between two points.

According to the present invention, a method of use includes an application user entering a unique user identification and secure login, such as by password, via a user interface on the GPS operable unit. Significantly, the present invention provides for user input of the first position or initial ball location with a prompt to mark your location, more particularly as the user is standing at the current ball location before hitting the ball. Then, another prompt requests the target location, such as by prompting whether the pin that marks the hole is the target. If the user enters YES, then he proceeds with the shot to hit the target. If the user enters NO, then at the ball, the user marks the location of the ball and also enters a target area. Thereafter, the user hits the ball preferably toward the target area. Once the shot is completed and the ball lands in a next location or position, the user enters input for location information of the resulting shot to indicate whether the ball hit the target. If not, then the plays or shots continue until the user enters affirmatively and the hole is played out, if on a golf course. The user continues to mark the pin or next start location and a series of start-to-target entries are made until the hole is played out, including putts. After the user is finished with the round, the information entered is uploaded from the handheld GPS device to the server, where the data is stored for that user's unique identity and for the corresponding play location. Alternatively, the user-entered information and GPS location data are automatically transmitted to the server through the network. While in a preferred embodiment at the time of the invention provides for user-entered information and GPS data to be automatically transferred when the unit is connected to a network via USB and a computer for communication with the remote server, other means of transmission including wireless would be considered within the scope of the present invention.

Methods of use of the unit to communicate the user inputs and GPS data to the server include the steps of user logging onto to server under the software as a service operation of the present invention; the user information and GPS data being downloaded or uploaded to the server computer, preferably directly from unit without requiring additional software or data to be saved or otherwise stored on an intermediate computer; while the user is logged online with server computer, accessing any presently loaded or prior-loaded inputs from golf play by that same user to modify or manipulate data, including providing inputs for additional information that provide more detail on the conditions of play; the software on the server performing statistical analysis on the inputs and providing output in the form of text, tables, diagrams, images and combinations thereof. Preferably, the analytical software functions on the remote server computer to provide more dynamic updates and software upgrades; however, analytical software operating on the portable unit or on an intermediate computer to perform the functions as set forth hereinabove is considered within the scope of the present invention.

The data and analytics is stored and categorized by user and course, as well as shots, clubs, etc. Preferably this information and data is not stored on the handheld device, but rather on the remote server computer, computer, or other data storage device or medium.

Regarding visualization of data, different visualization options of the shot data and related analytics are available, including tabular and map-type views, that are selectively reviewable by the user on the device, or on a remote computer connected to the server via the network, connected to the web. Additional shot-by-shot views and statistics are optionally reviewable by the user and/or a third party with permission for such review. In addition to the primary information, the user optionally enters secondary information, including but not limited to slope of the landscape between the ball and the target area, ball position on that landscape, wind direction, wind strength, precipitation, humidity, penalty strokes, altitude, player status (such as injury, sickness, etc.) and combinations thereof.

Other options the user activates on the unit for the present invention include saving data inputs, operating a report function to generate basic feedback to the user about his/her play inputs compared to targets, clubs, conditions, and combinations thereof. Reports include average score, breakdown by par/hole, scrambling percentage, sand saves, driving accuracy, and other standard metrics and combinations thereof, as well as trends information. Additionally, information is available for review by club, by conditions or situations such as represented by the secondary inputs. A percent error index (PEI) is also available; this PEI is a calculation of how close the actual user shots were from start to target for each series within the play period, which may be the golf course, a series of holes on a golf course, a practice session, a golf school or lessons by professional instruction over a predetermined period of time.

By way of example and not limitation, one modification that the systems and methods of the present invention permit the user to make is to modify shot information, including ball location as provided by the GPS. This is particularly helpful in the case of play on a golf course wherein the user/golfer makes an error such as hitting the ball into a body of water. According to golf rules, this is considered a penalty and a drop shot is permitted over the last point where the ball crossed land; however, for the purpose of providing statistical analysis and feedback of golf performance, it is not helpful for the system or software to consider that the shot merely landed at that drop point, rather than at the actual location or area where the ball hit the water. This type of modification is relevant for penalty shot circumstances. In this case, the user modifies the shot information while accessing the software operating on the server computer. Shot modification can be manually entered, but more preferably, the user click selects or otherwise indicates a location on a map of the golf course hole that was being played. Thus, the user indicates on the map of a hole where the end point of a shot actually was for the penalty, i.e., in the water, out of bounds, or is lost.

Since for any of these occurrences, the user will not be able to mark the precise location where the ball landed, the system allows the user to click on the map of the hole to estimate the location. Preferably, each pixel or predetermined group of pixels of the map are associated with separate GPS coordinates. When the user clicks on the map, the correspondingly associated GPS coordinates of where they clicked are used as the end point for that shot instead of the penalty start location. The line of the shot will then end with an X instead of a dot to indicate that this is an estimate rather than an actual pinpoint location of the ball at the end of that shot. The next shot will then start from where the golfer took his penalty shot. If no map exists, they will be able to enter the distance and direction manually.

Regarding basic functionality of the system and methods of the present invention, initial setup includes downloading a Plug-In and installing it on a personal computer (PC) or other computing device for providing a connection between the PC and a remote server computer data accessible via a web site. FIG. 1 illustrates a screen shot of a website page for initial set-up.

Figure 2:
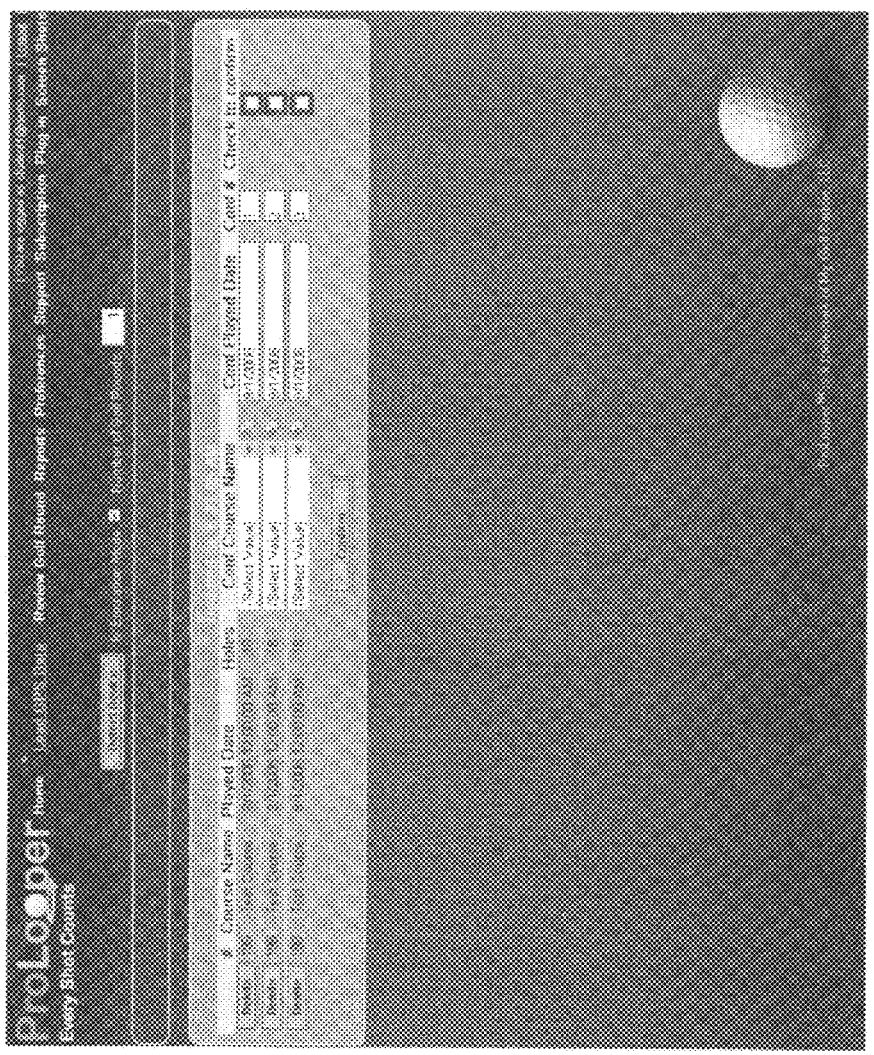
Figure 3:
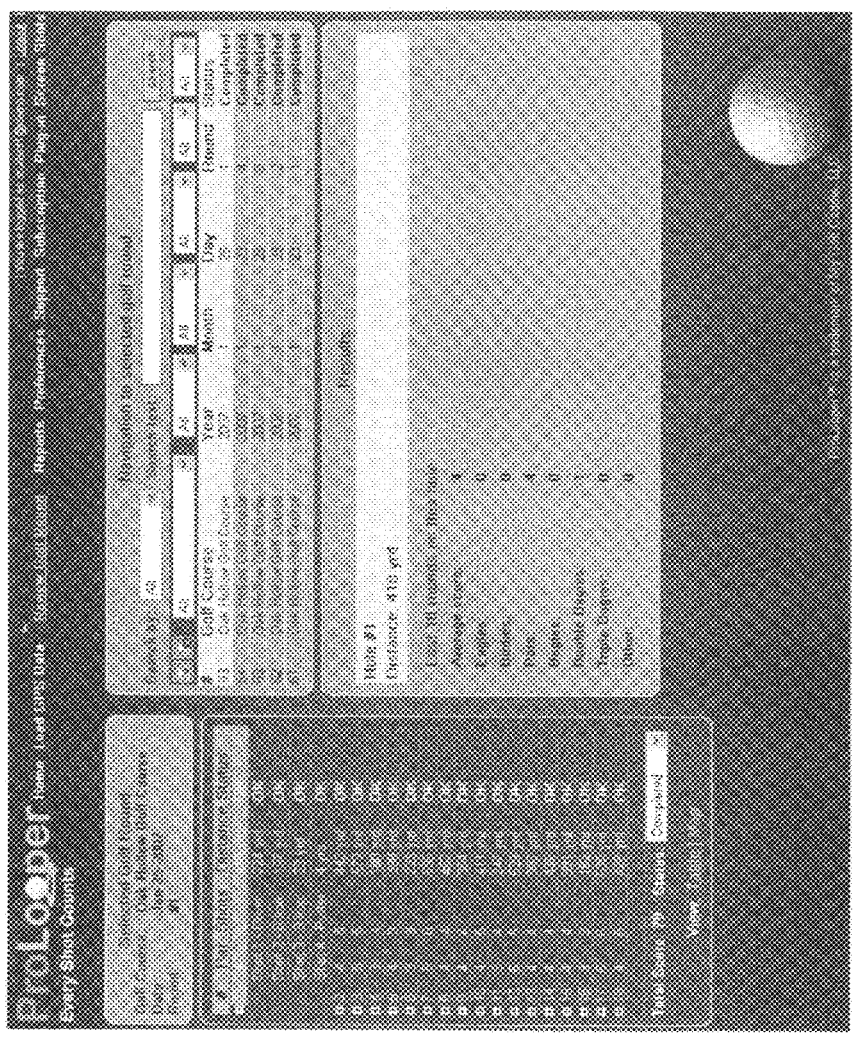

As illustrated in FIG. 2, the software is operable to provide for the user, after logging in, the first thing to connect the handheld shot mark data capture input device to a PC via USB cable. The user can click-select the "Detect Device" button or option on a Load GPS Data screen, for example as shown in FIG. 2. Any rounds that are currently captured on or input into the device during golf play will be listed on this screen. The software is operable to allow the user to verify the course and date, and then checks to confirm. When the user click-selects the "Confirm" button, the rounds are then available in the "Review Golf Round" screen, which is viewable on a display on a computer. Preferably, the data captured on the device is uploaded to a server computer and the display or screen is provided via a website that is accessible by a user with any web-enabled handheld or other device, such as a computer, that is web-connected or in communication with a network through which the website-based content is delivered. On this screen view or graphic user interface, the software is operable to allow the user to select or indicate the round he wishes to review. The status of a round that has not been reviewed yet is preferably marked or noted as having the status of "Uploaded". A partially reviewed round will be indicated as "Changed", and a completely reviewed round is indicated as "Completed" on the user interface. In one embodiment of the present invention, the rounds will not be included in reports unless the round is completed.

In one embodiment of the present invention, the systems and methods provide for at least two different ways to look at or review a round with visual representations via the website interface, specifically "Table" and "Map" views, as illustrated in the figures. Table view is an easy to view screen that just lists each shot, along with the distance, as illustrated by the website screen shot in FIG. 3. To edit the properties of a particular shot, a user simply has to click-select or otherwise indicate or select a given shot represented on the user interface. The user can add situational data such as lie, lay, slope, club, type of swing, weather information, etc.; preferably, this additional information is added via the website user interface after the round is completed and uploaded, rather than being entered or input through the device during play so as not to interrupt or slow the flow of the golf game while it is in progress. However, this preference is based upon currently existing handheld GPS devices, in particular that are "purpose-built" for use with golf alone, which typically lack additional memory, speed, and ease-of-use to include more inputs on the course. However, if a device is being used by a third party, such as a caddie, then additional inputs can be made with an adequate handheld device on the course. Normally, for an individual user without a caddie entering the information, it is preferably not to interrupt the flow of the game by making these inputs on the course during play.

Figure 4:
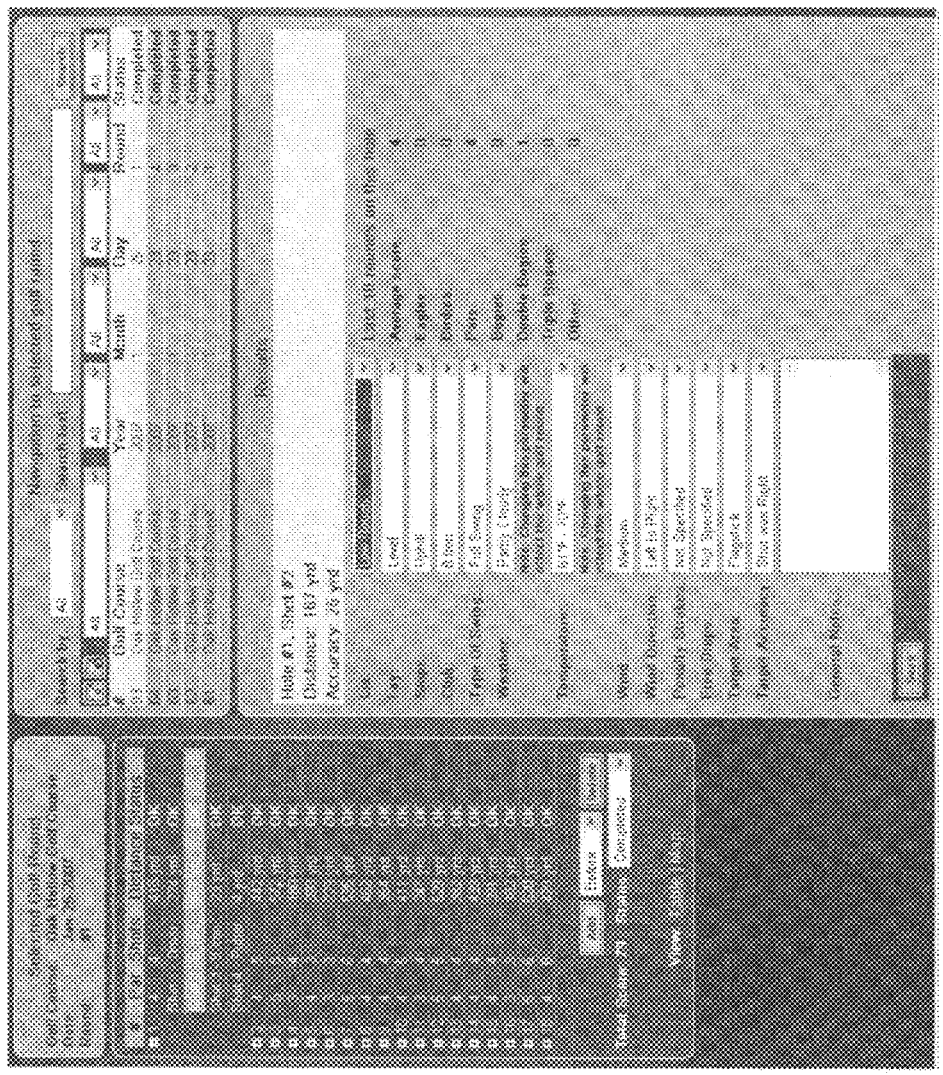

As illustrated in FIG. 4, a screen shot is provided to illustrate when the user selects or indicates a lie of "green", the next shots on that hole will preferably automatically default to green, and the club will automatically change to putter, without additional inputs from the user required on the course. There are a few other examples like this, all designed to save the user time when reviewing a round. Penalty shots are handled differently, as set forth hereinabove, for the sake of illustration of the present invention, but not as limitations thereto.

Figure 5:
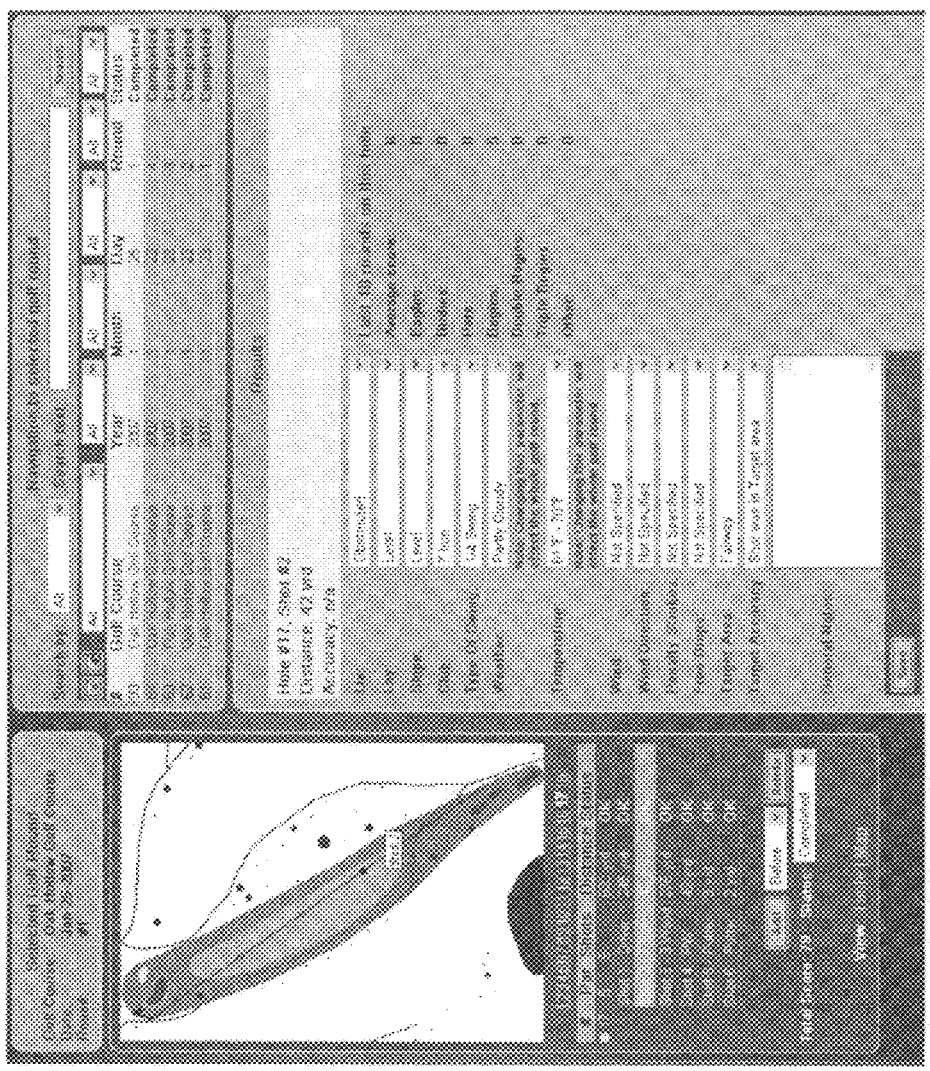

Another option for reviewing a golf round is with the Map view user interface, as shown in FIG. 5. This graphical representation of a golf course is provided for golf course play where those courses have been mapped by a GPS coordinate system, aerially, or otherwise depicted approximately to scale or at least representative of the course layout and distances with respect to each hole. If the course the user is reviewing does not have a map available for any reason, then a blank screen may be provided that indicates that the course is not mapped or that a map is not yet available.

The systems and methods of the present invention allow the user to review shots the same way here, by clicking on the shots below the map. It also allows users to click the actual map, where the red dot shows the landing point of that particular shot. A straight line is shown on this map for this feature at the time of the invention; other visualization is also considered within the scope of the present invention. Preferably, the user sees the actual line that his/her shots have taken, from the tee to the hole, or intermediate shots therebetween.

In the contingency for penalty shots, if a user hits his/her shot into the water, they can't stand next the ball and mark the location with the device. The system allows the user to click on the map to show where a particular shot landed. If no map exists, the user can estimate the distance. The user will go through each shot. When finished the round changes to "Completed" status, and is now part of the statistics in the Reports section (see FIG. 5).

This is part of the Reports section. This first report is the Overall Statistics mode. It shows the selected round (you can select any one round from your entire history), the last round, then the past 10, 20, 30, and all rounds to the right. It shows stats for score, average score on the various pars, greens in regulation (GIR), sand save percentage, and driving accuracy percentage.

Figure 6:
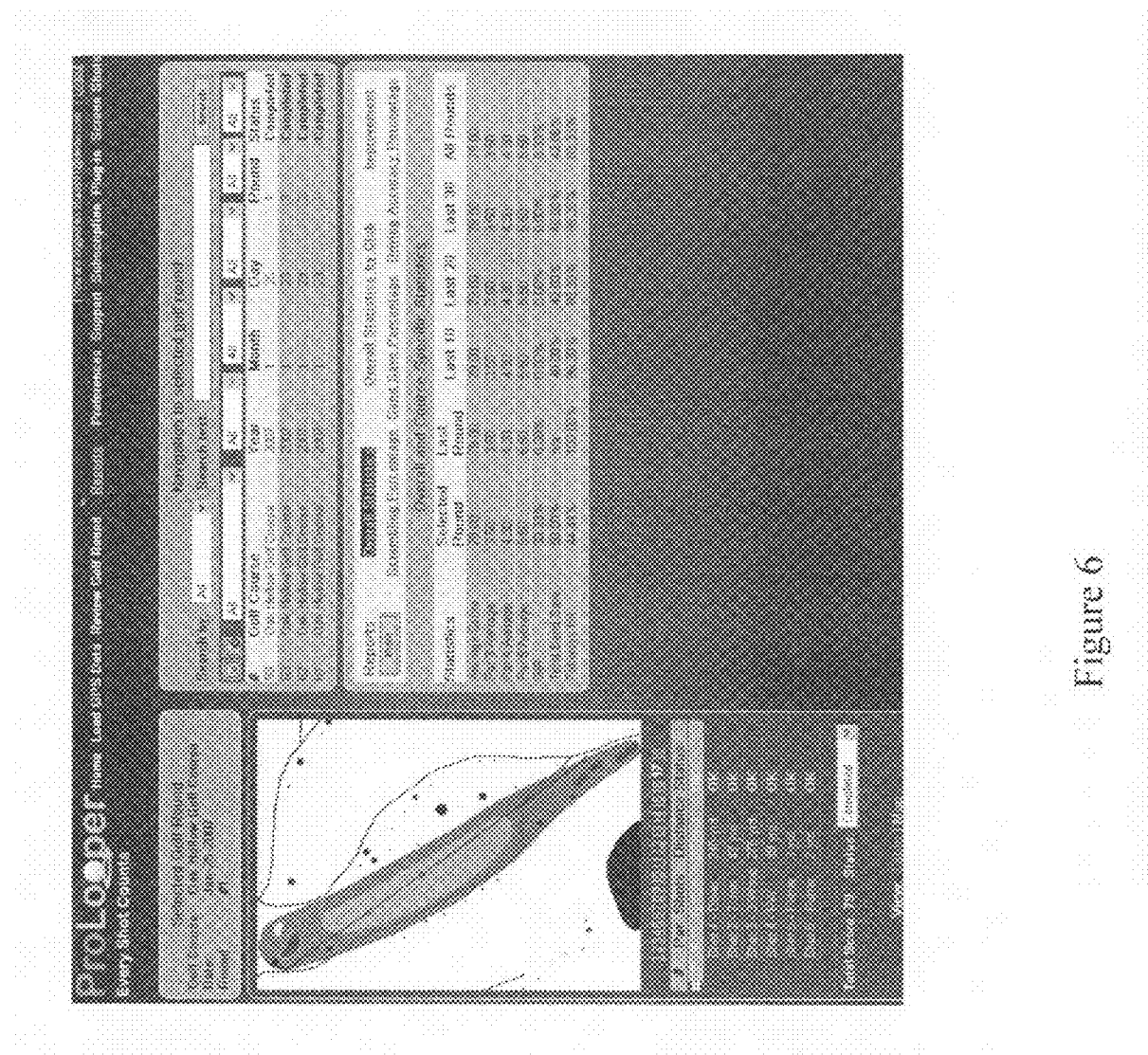

The Reports section as illustrated in FIG. 6 also allows a user to filter only the rounds they want to see. If the user wants to view only rounds at a particular course, they can select that course from a drop-down menu (filter button). Year, month, and day filters also exist.

Figure 7:
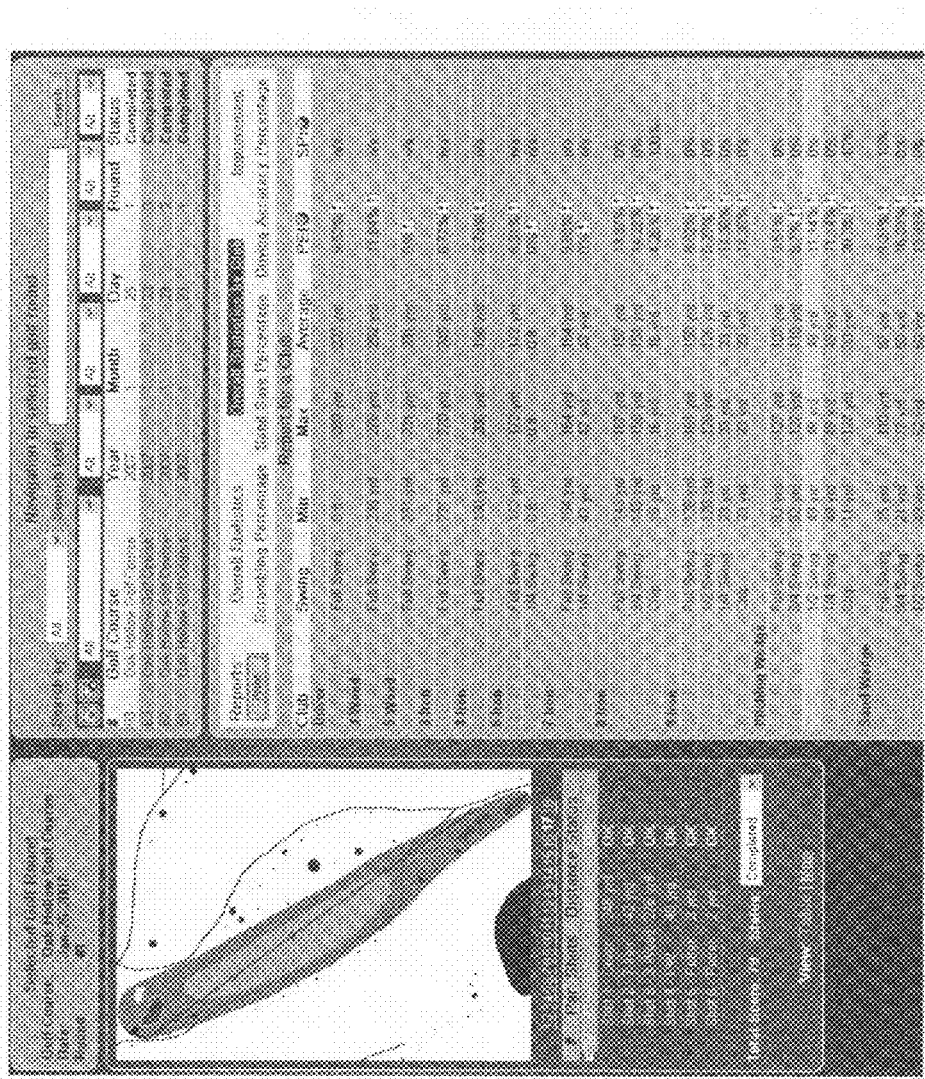

FIG. 7 provides a screen shot view showing an Overall Statistics by Club report. It shows the minimum, maximum, and average distances for each club (and type of swing) that you've used. The PEI (Percentage Error Index) shows you how far you're missing your target by. For example, if I have 100 yards to the pin, and I hit my shot 10 yards away, my PEI is 10%. SPI (Scoring Percentage Index) is a percentage of how often you hit a shot to within 6 feet of the hole.

Figure 8:
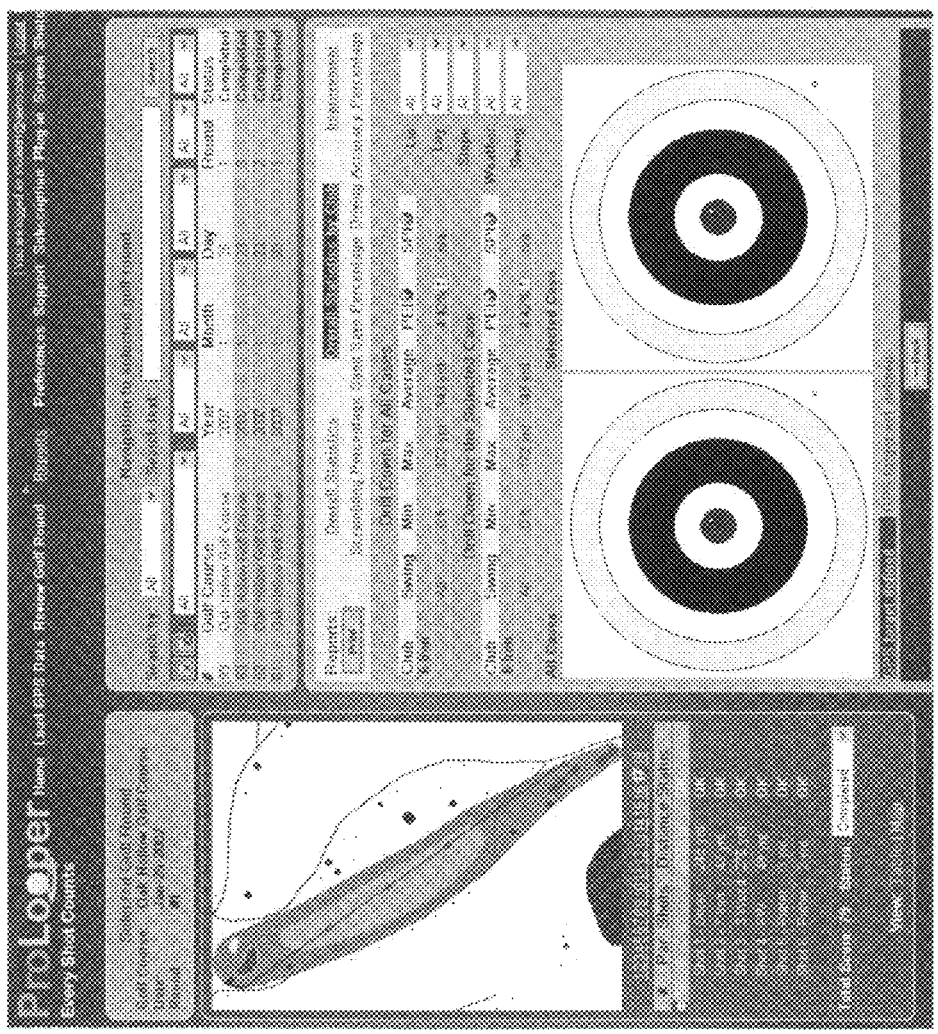

From the same report, as illustrated in FIG. 8, a user can get a closer look at data relating to the accuracy of each club by clicking the club. The first screen that you see below shows you how accurate you are with that particular club, in relationship to the flagstick. Only shots that have a target of "Flagstick" will show here. The left chart is for all shots with that club. The right chart can be further dialed down by clicking the drop-down boxes on the right side of the screen. If you only want to see only those shots out of a fairway bunker, off an uphill lie, out of heavy rough, etc., then the user can specify that at this point.

Figure 9:
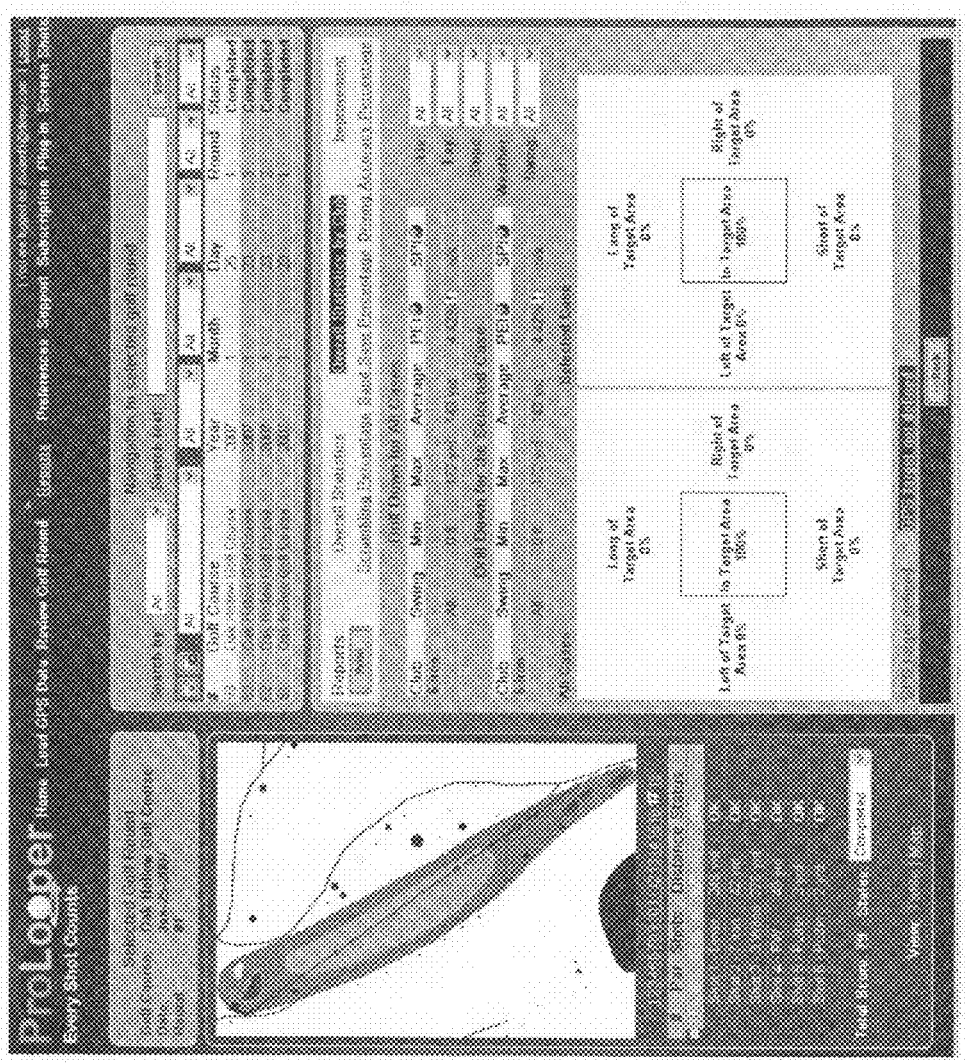

For those shots that are not targeted at the flagstick, the present invention has provided a label for it indicating a "Target Area". By clicking the link below the charts as illustrated in FIG. 9 that is labeled "GPS target not defined", the user will see the indicated user interface and graphics. Same goes for the left chart showing all shots for that club, and the right being selectable.

Figure 10:
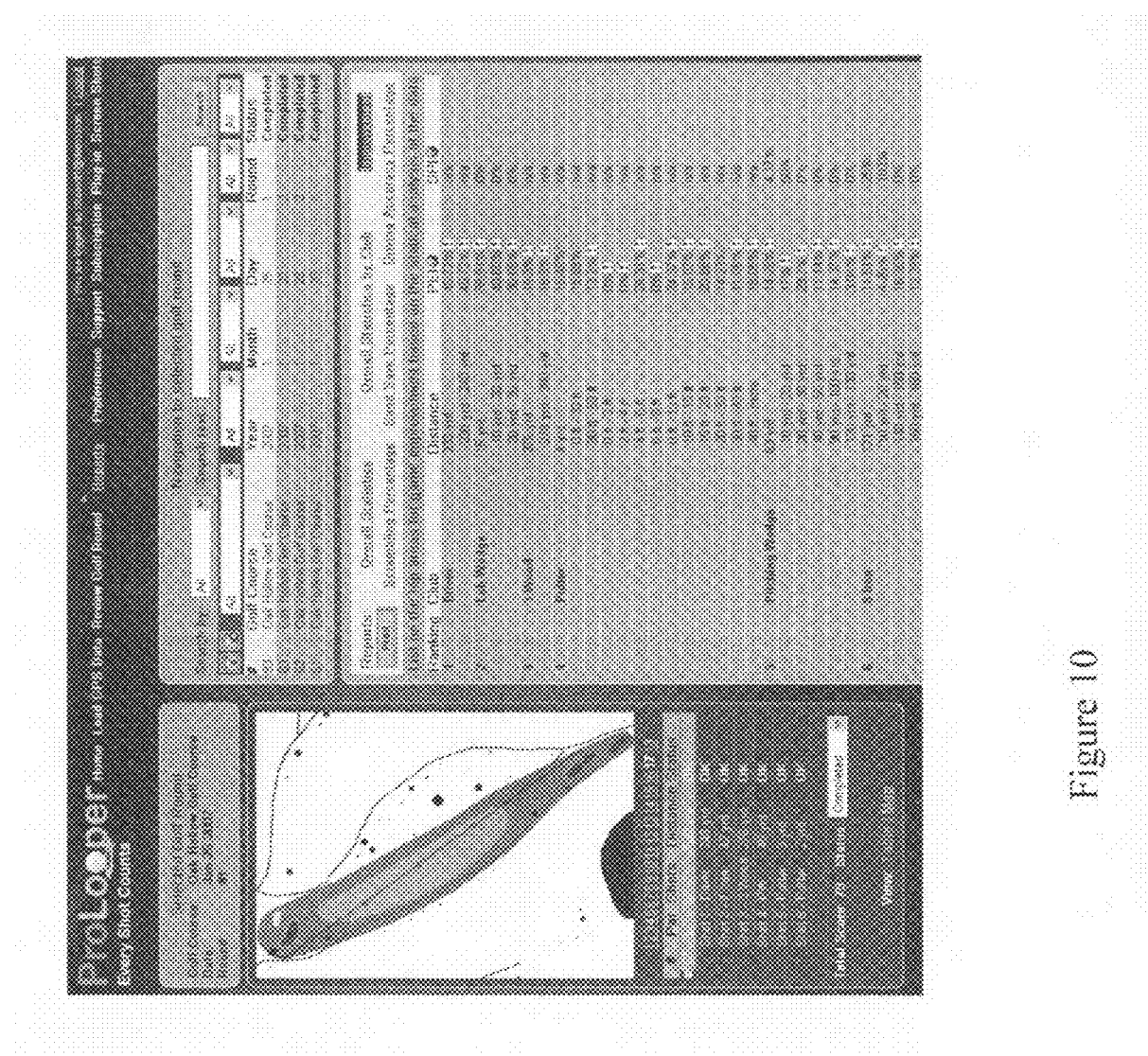

The next report shown in FIG. 10 is the Improvement report. This shows a list of clubs, with the clubs that have the highest error percentage at the top. The higher the PEI, the worse the user is with that club. Those are the clubs with which the user needs to work on improvements.

Figure 11:
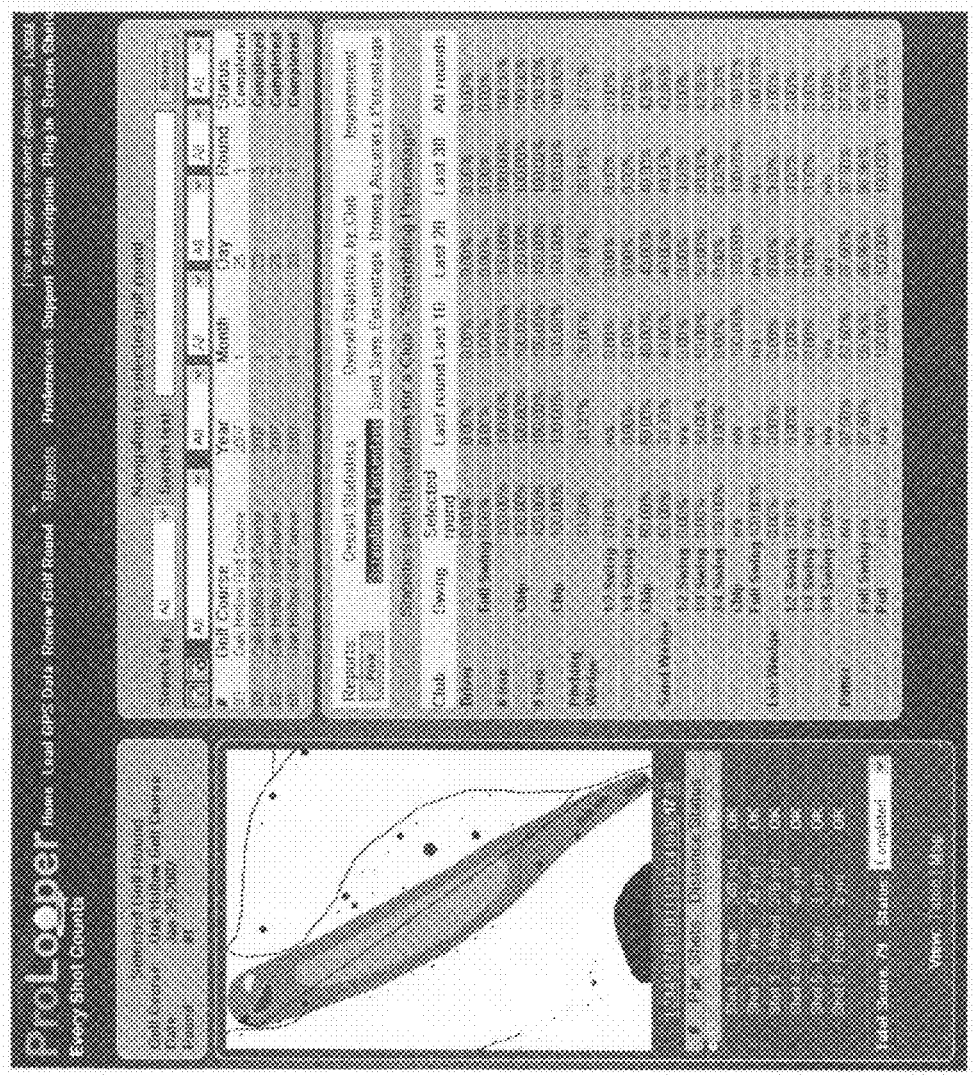
Figure 12:
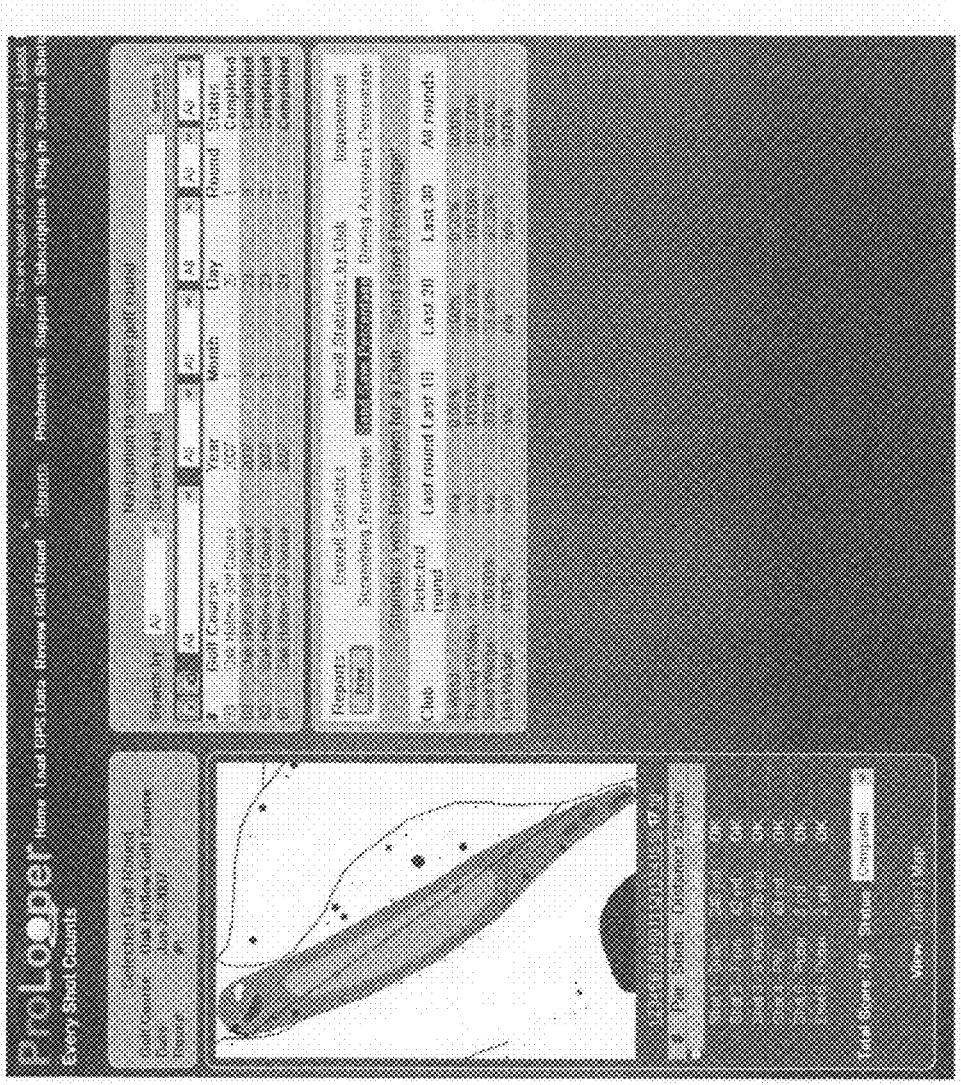
Figure 13:
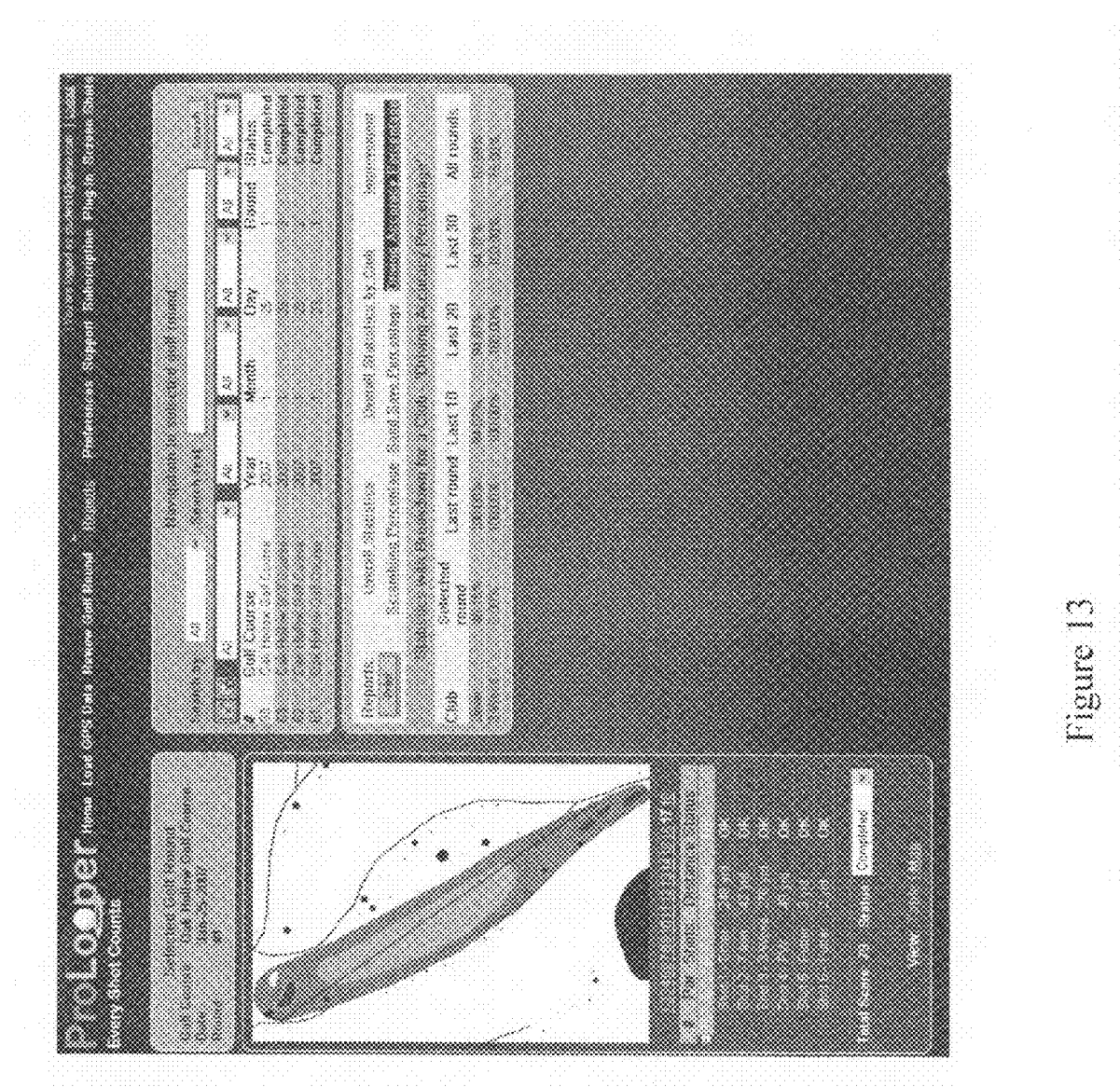

The next report illustrated in FIG. 11 shows a Scrambling Percentage report. This shows the user how often he/she makes par when he/she misses a green in regulation. Sand save reports show how often the user gets up and down out of a green-side sand bunker, as illustrated in FIG. 12. Driving Accuracy shows how often the user hits the fairway from the tee, as illustrated in the screen shot from the web-based user interface for FIG. 13.

Figure 14:
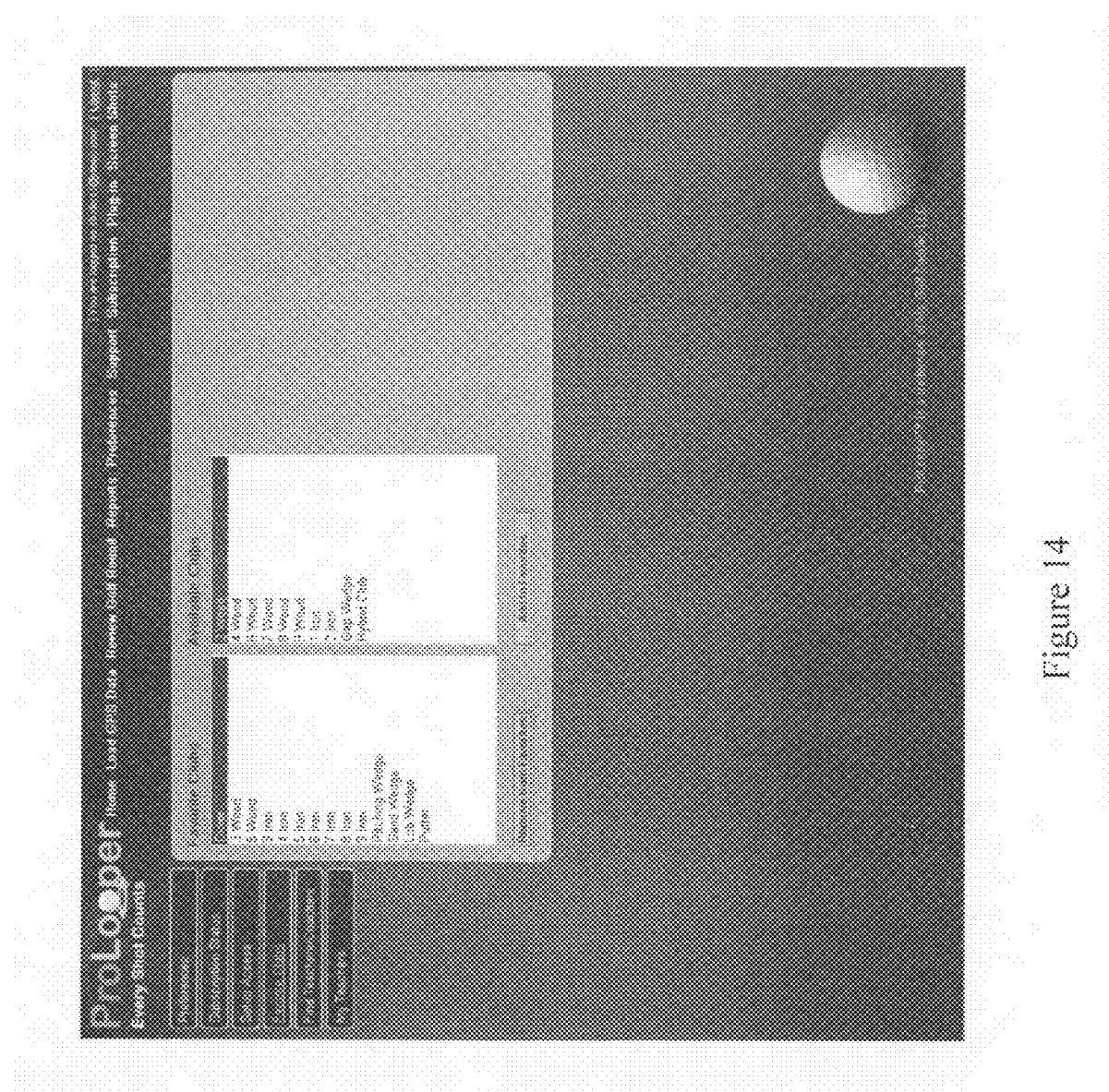

The system and methods of the present invention also provide for options that permit a golfer to set up favorite clubs, which prevents them from having to scroll through the entire list of clubs when reviewing shots on the user interface; this is illustrated in FIG. 14.

Figure 15:
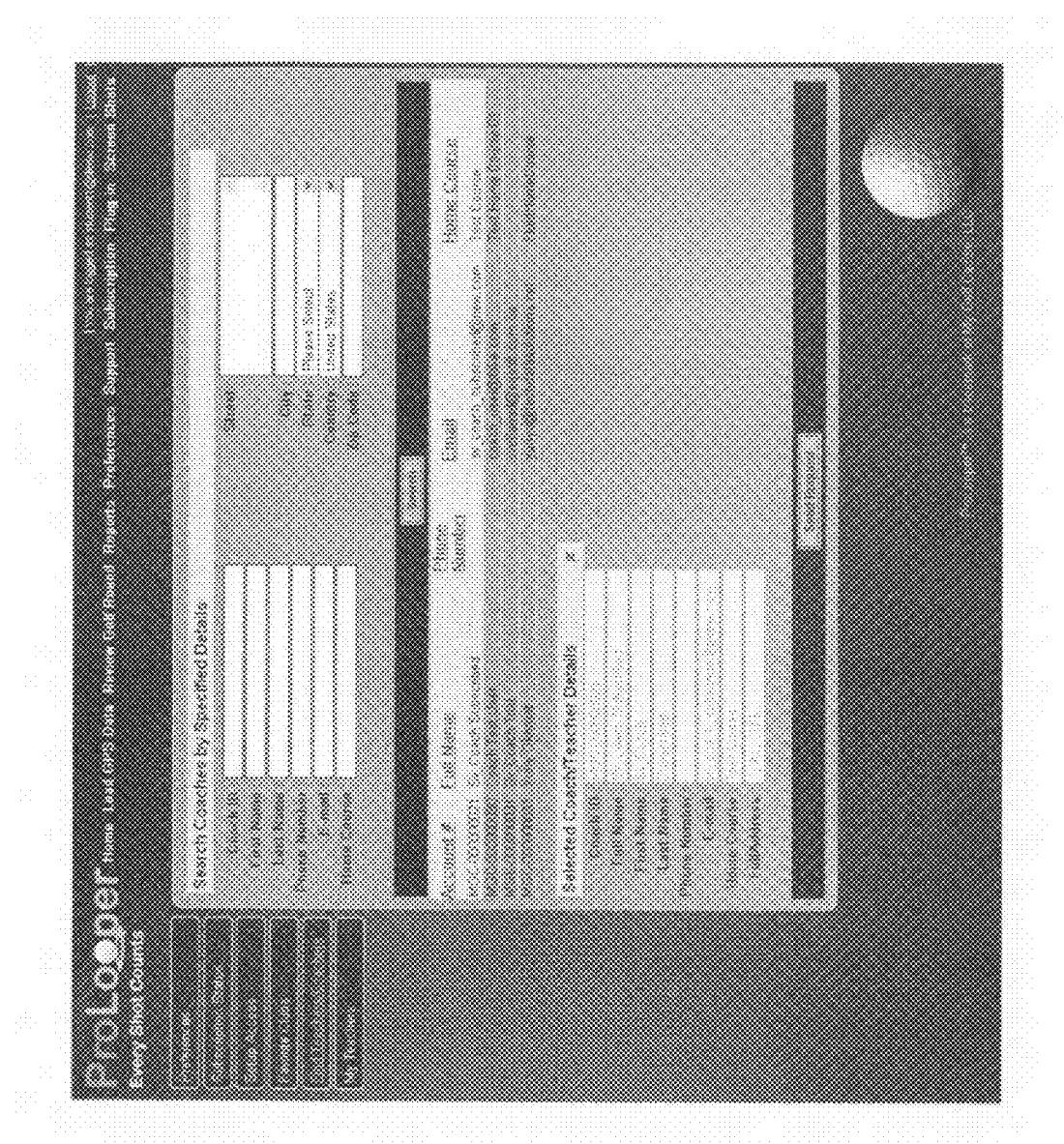

The system and methods of the present invention also provide functionality that permits a user to allow or provide access to their coach or PGA professional. In one embodiment of the present invention, this is done by a user making a click-select of the "Find Teachers/Coaches" link in the Preferences section. (The coaches and PGA Pros check a box that identifies them as a coach/teacher when they sign up). The user finds a coach/teacher, and clicks the "Send Request" button or option, as illustrated in FIG. 15.

Figure 16:
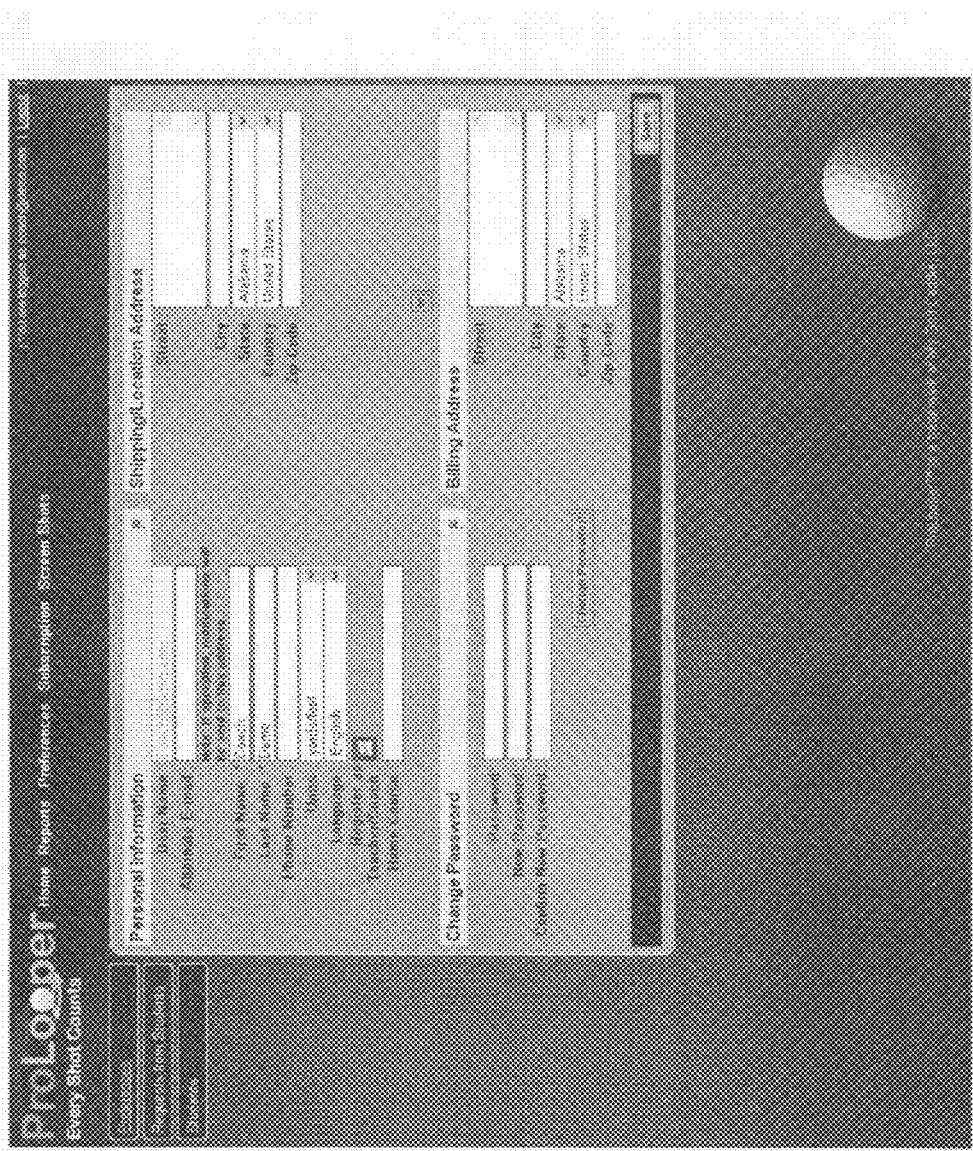
Figure 17:
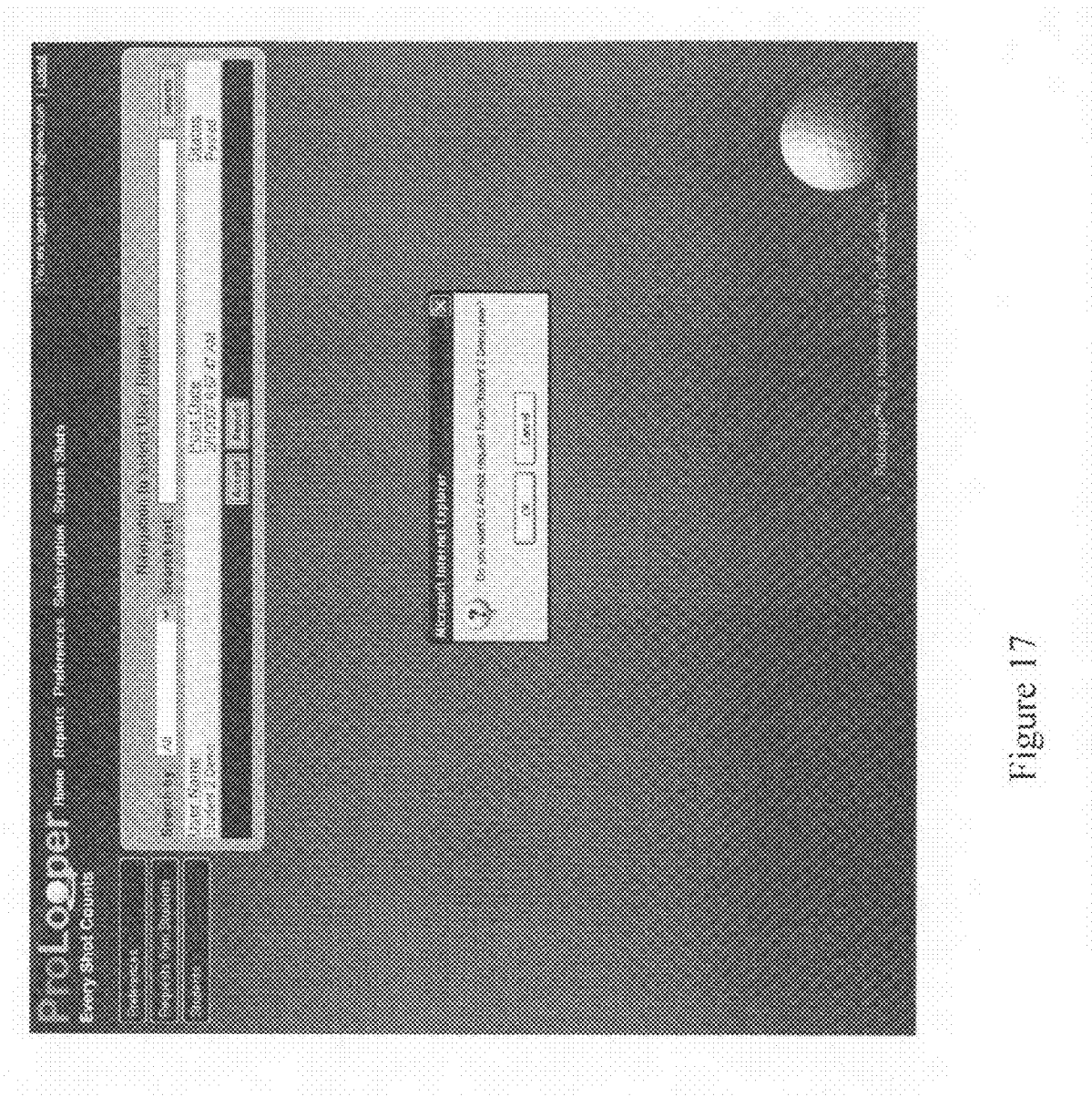
Figure 18:
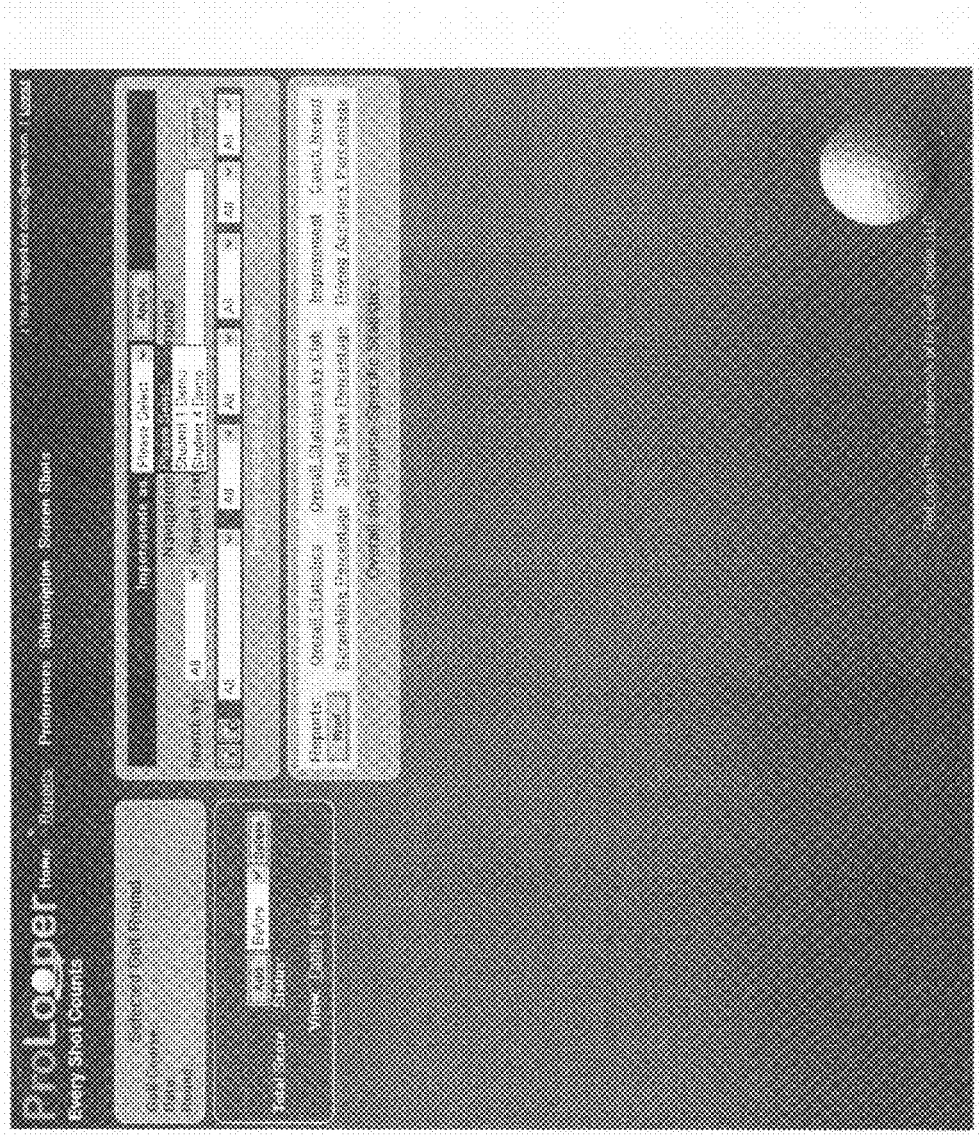

FIG. 16 illustrates a graphic user interface that provides options for coaches and teachers sign up to receive notices and review rounds actually made by their students who have extended access to the data to them. After a student sends a request to a coach/teacher, the coach/teacher is provided the option to log in for viewing an interface as illustrated by FIG. 17. Once accepted, preferably the coach/teacher can then view, but cannot make changes to, all the reports that the golfer or user also reviews. The coach/teacher click-selects or indicates the desired golfer from a listing such as the "Impersonate as" drop-down, and all of that golfer's reports are available, as shown in the FIG. 18.

Figure 19:
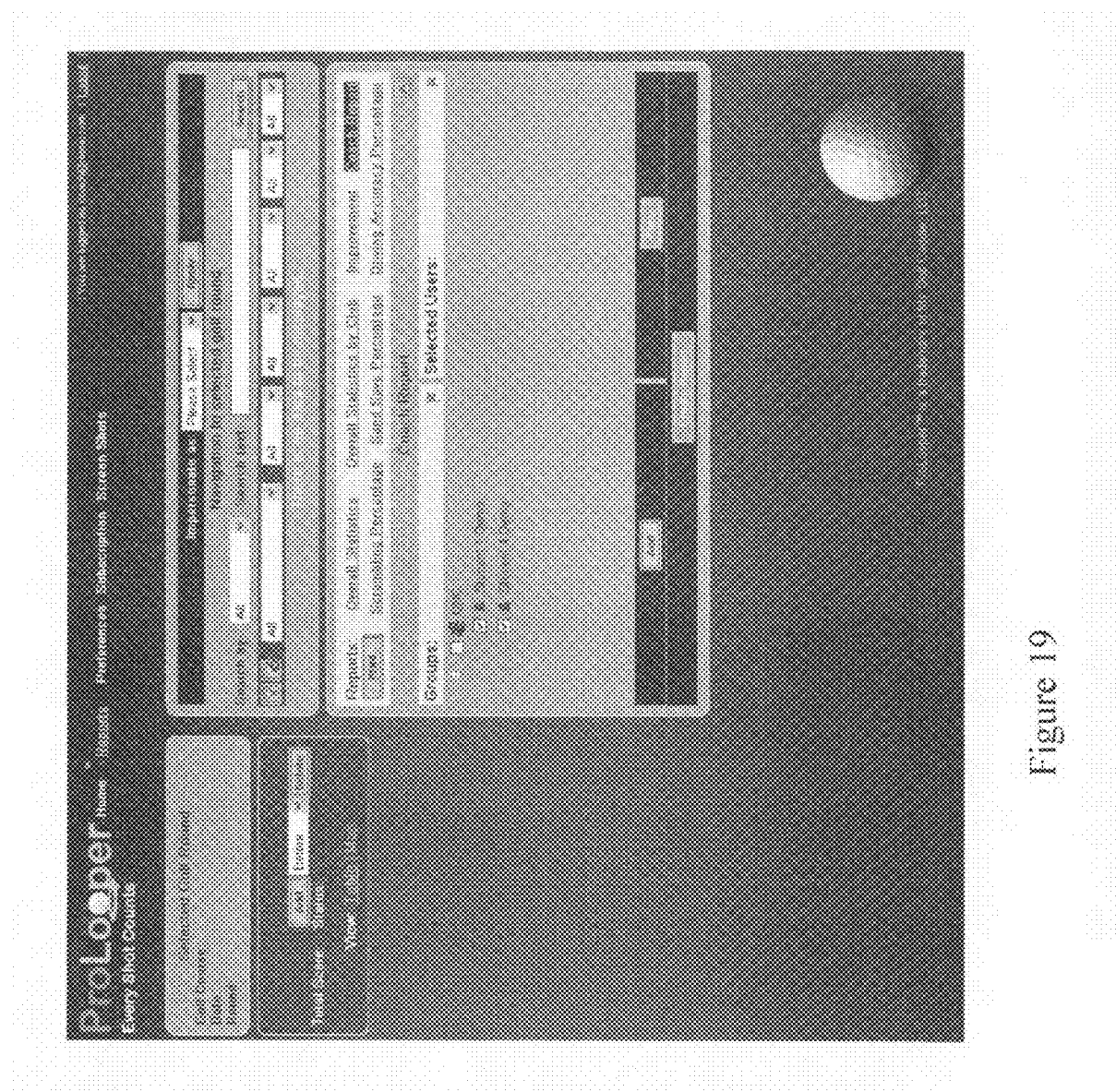

As illustrated in FIG. 19, the systems and methods of the present invention provide coach/teacher with the option to create a report that compares multiple golfers or users, preferably side by side. By click-selecting another option, such as "Coach Report", they see a list of all golfers they have access to. They then select which of these golfers to compare, and click-select "Add". Preferably a multiplicity of golfers or users' data is available for review and comparison by the third party coach/teacher.

Figure 20:
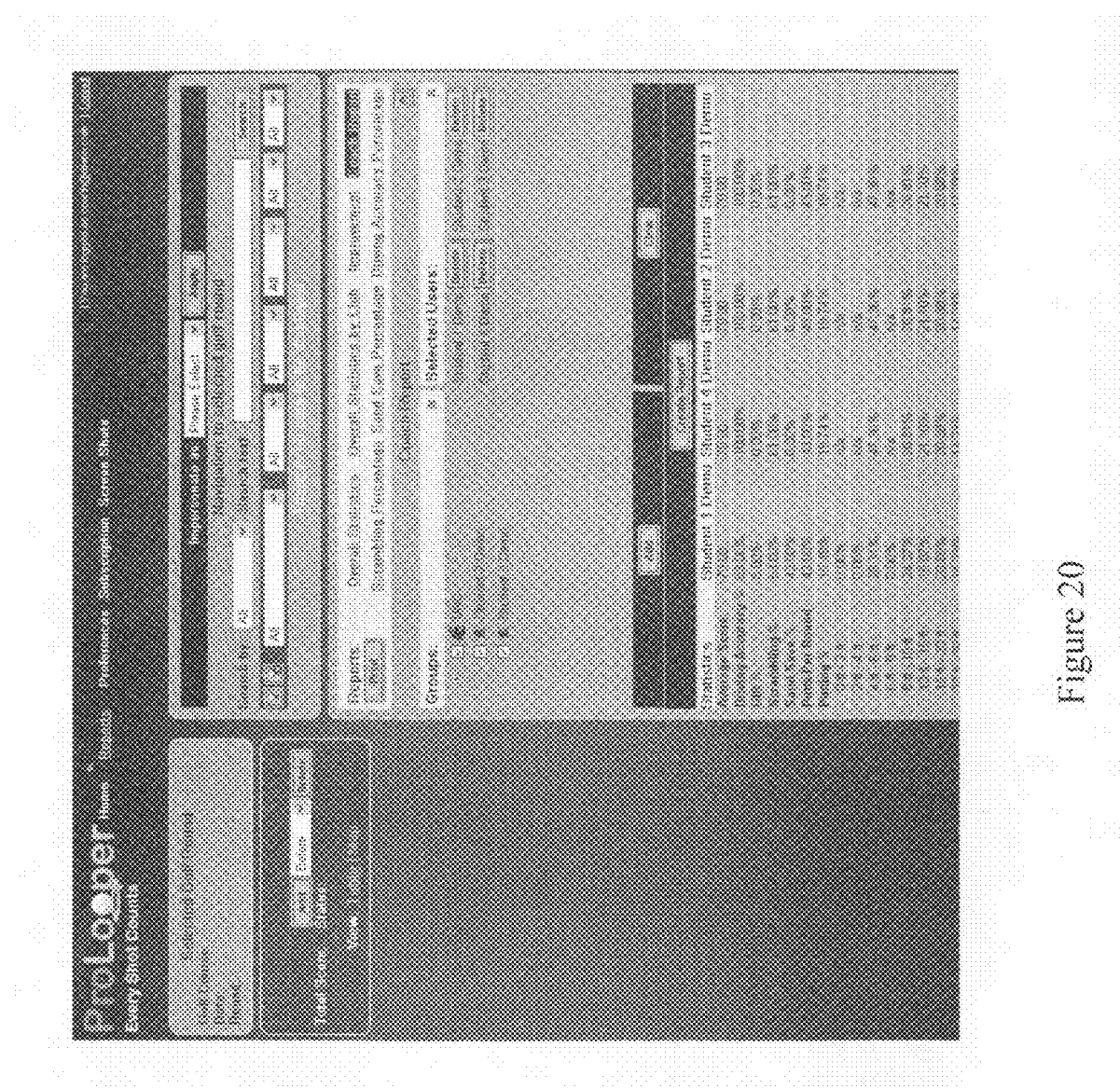

As illustrated by the screen shot in FIG. 20, the user then click-selects a "Create Report" button to view the report, showing those selected users or golfers in a comparative manner, preferably with data in tabular format side by side, but optionally in an overlay graphic of shots or other visualization that facilitates comparison or analysis.

Certain modifications and improvements will occur to those skilled in the art upon a reading of the foregoing description. By way of example, automatic conversion between English units of measure (such as feet, yards) to metric equivalents may be included for user convenience. The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention and the following claims.

What is claimed is:

1. A system for providing statistical analysis for golf performance of a user comprising:
    a portable input device constructed and configured to capture shot data, including GPS data, during the golf play of a golfer, the device further configured to transmit the shot data to a computer for review and analysis of the shot data;
    the portable input device comprising a graphical user interface configured to accept user inputs independent of the physical location of the user;
    the computer further including software operable for providing statistical analysis of the shot data;
    wherein the user inputs are a series of corresponding starting points and user-defined target areas;
    wherein each of the target areas not being a pinpoint target is created by a single input; and
    wherein the statistical analysis includes outputs relating to the golfer's golf performance over a predetermined period.

2. The system of claim 1, wherein the statistical analysis of the shot data includes outputs selected from text, tabular, diagrammatic, image-based outputs, and combinations thereof.

3. The system of claim 1, wherein the statistical analysis includes trends in the golfer's golf performance over a predetermined period.

4. The system of claim 1, wherein the input device is a handheld device.

5. The system of claim 1, wherein the input device has GPS functionality.

6. The system of claim 1, wherein the computer is a remote server computer (RSC) and the shot data is uploaded from the device to the RSC through a communications network.

7. The system of claim 1, wherein the unit is operable to receive from the golfer shot data inputs including GPS data relating to golf shots, and wherein the unit is operable to transfer the shot input data to the computer for analysis to be performed by software operating thereon.

8. The system of claim 7, wherein the GPS data includes for at least one golf shot GPS data relating to at least a starting point, a target area and an end point where the golf ball came to rest after the golf shot.

9. The system of claim 1, further including a unique user identification associated with each golfer that is usable by the golfer to access a remote server computer for uploading his data, and for modifying and adding information, including secondary information.

10. The system of claim 9, wherein the secondary information is selected from course conditions, weather, golfer status, equipment specifics, shot corrections, penalty shot positions, and combinations thereof.

11. The system of claim 1, wherein the unit automatically converts English units of measurement to metric equivalents and/or metric units of measurements to English unit equivalents.

12. The system of claim 1, wherein the input device is configured to be retrofitted to existing GPS golf play units.

13. A method for providing statistical analysis of golf performance of a golfer comprising:
    the golfer inputting shot data through a graphic user interface, the shot data including corresponding coordinates for a series of shots including a start point and user-defined target areas throughout a course of play using a GPS-enabled input device;
    wherein each of the target areas not being a pinpoint target is created by a single input;
    the user uploading the shot data to a remote server computer;
    wherein the portable input device is configured to provide inputs and target areas independent of the physical location of a user;
    software operable on the computer performing statistical analysis of the shot data associated with the golfer; and
    the software providing analytics outputs to the user via a display having a second graphical user interface.

14. The method of claim 13, wherein the statistical analysis includes trends in the golfer's performance over a predetermined period.

15. The method of claim 13, wherein the golfer selects review options provided on a graphical user interface on a display.

16. The method of claim 13, further including the step of entering penalty shot information including actual ball location for the purpose of shot accuracy in a penalty shot situation.

17. A method for providing statistical analytics of golf performance comprising:
    providing a GPS-operable device with a graphic user interface configured to accept inputs from a user relating to golf shot data during play on a course;
    uploading the golf shot data including GPS data and user-defined target areas to a computer having software for providing analysis of the data;
    wherein the portable input device is configured to provide inputs and non-pinpoint target areas independent of the physical location of a user;
    wherein each of the target areas is created by a single input; and
    providing outputs including analytics of the data, wherein the outputs are viewable by the user via a graphic user interface on a display, including text, tabular, graphic, and image-based outputs that include trends information for the golfer, all based upon actual golf play on course situations, wherein the golfer inputs shot data during play, without interrupting the flow of the game, and uploads the shot data for analytics and review online.

18. The method of claim 17, wherein the analytics includes text, tabular, graphic, and image-based outputs that include trends information based upon the shot data input by the user.

19. The method of claim 17, wherein the shot data is based upon actual golf play on course situations.

20. The method of claim 17, wherein the golfer inputs shot data during play.

* * * * *